United States Patent
Kong

(10) Patent No.: US 7,324,086 B2
(45) Date of Patent: Jan. 29, 2008

(54) DATA INPUT DEVICE AND METHOD FOR DETECTING LIFT-OFF FROM A TRACKING SURFACE BY LASER DOPPLER SELF-MIXING EFFECTS

(75) Inventor: Yuan Kong, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 477 days.

(21) Appl. No.: 10/761,855

(22) Filed: Jan. 21, 2004

(65) Prior Publication Data
US 2005/0156875 A1 Jul. 21, 2005

(51) Int. Cl.
*G09G 5/00* (2006.01)
(52) U.S. Cl. ...................... 345/157; 345/166
(58) Field of Classification Search ............. 345/156, 345/157, 163, 166, 179; 250/221; 356/28, 356/496; 382/312, 313, 321
See application file for complete search history.

(56) References Cited

U.S. PATENT DOCUMENTS

| | | | |
|---|---|---|---|
| 4,364,035 A | 12/1982 | Kirsch | |
| 4,477,890 A * | 10/1984 | Mooney et al. | |
| 4,719,455 A | 1/1988 | Louis | |
| 5,274,361 A | 12/1993 | Snow | |
| 5,382,785 A * | 1/1995 | Rink | 250/221 |
| 5,453,644 A | 9/1995 | Yap et al. | |
| 5,574,480 A | 11/1996 | Pranger et al. | |
| 6,057,540 A | 5/2000 | Gordon et al. | |
| 6,448,977 B1 | 9/2002 | Braun et al. | |
| 6,707,027 B2 * | 3/2004 | Liess et al. | 250/221 |
| 6,741,335 B2 * | 5/2004 | Kinrot et al. | 356/28 |
| 2003/0103037 A1 | 6/2003 | Rotzoll | |
| 2005/0035947 A1 | 2/2005 | Lutian | |
| 2005/0134556 A1 | 6/2005 | Van Wiggeren et al. | |

OTHER PUBLICATIONS

Ohtsubo et al., "Velocity Measurement of a Diffuse Object by Using Time-Varying Speckles," Optical and Quantum Electronics, 1976, pp. 523-529, Chapman and Hall Ltd., Great Britain.
Optical Mouse Saves Space, The Online Photonics Resource, http://optics.org, Dec. 8, 2003, 2 pp., United States.
Prototype Device, The Online Photonics Resource, http://optics.org, Dec. 8, 2003, 1 pg., United States.
Optical Scrolling, The Online Photonics Resource, http://optics.org, Dec. 8, 2003, 1 pg., United States.
Wang, et al., Self-Mixing Interference Inside a Single-Mode Diode Laser for Optical Sensing Applications, Journal Of Lightwave Technology, Sep. 1994, vol. 12, No. 9, London, England.

* cited by examiner

*Primary Examiner*—Regina Liang
(74) *Attorney, Agent, or Firm*—Senniger Powers

(57) ABSTRACT

A data input device for use with a tracking surface having light-scattering properties. The device comprises a single laser configured to project a light beam onto the tracking surface. A portion of the light beam striking the tracking surface reflects back into a cavity of the laser and thereby alters at least one characteristic of the projected light beam. A detector associated with the laser detects the altered characteristic of the light beam projected by the laser. A controller responsive to the detector determines the relative distance between the device and the tracking surface as a function of the altered characteristic of the projected light beam detected by the detector. Another device comprises a laser projecting a light beam oriented substantially perpendicular to the tracking surface when the device is operating in a tracking mode.

39 Claims, 8 Drawing Sheets

DATA INPUT DEVICE AND METHOD FOR DETECTING LIFT-OFF FROM A TRACKING SURFACE BY LASER DOPPLER SELF-MIXING EFFECTS

TECHNICAL FIELD

Embodiments of the present invention relate to the field of computer input devices, and particularly data input devices, such as a mouse or optical pen, employing light striking a tracking surface for detecting movement. In particular, embodiments of this invention relate to data input devices capable of generating laser light beams altered by Doppler self-mixing effects, detecting altered characteristics of the projected laser light beams, and determining the relative distance between the data input device and the tracking surface as a function of the altered characteristic of the projected light beam.

BACKGROUND OF THE INVENTION

Previous computer input devices, such as mice, include rotatable balls mounted within a housing, yet rotatably engaging a surface. As the housing of such a mouse translates across the surface, the ball rotates within the housing, engaging horizontally and vertically situated wheels that rotate against the ball, thereby indicating horizontal (e.g., side to side or x-direction) and vertical (e.g., back and forth or y-direction) movement of the mouse across the surface. When the device is lifted from the surface, hereinafter referred to as lift-off, the ball stops rotating and the horizontal and vertical movement information provided by the wheels stops. This feature is particularly useful to a user who has reached a point where the device can no longer move with respect to the tracking surface, but the user would like to continue tracking in that particular direction on screen. By lifting the device off of the tracking surface, the user can reposition the device, while the cursor remains stationary because tracking is suspended during lift-off. When tracking resumes, horizontal and vertical wheel rotation translates into an on-screen visual image of a cursor that responds to movement of the device. Because such devices have a moving ball passing through a hole in the housing, such devices often become contaminated with dust and dirt, which may yield inaccurate or intermittent cursor tracking. Moreover, the tracking surface and ball require sufficient friction between the two to cause the ball to rotate when the housing translates over the surface. To help provide such friction and minimize contamination of the device, specialized tracking surfaces (e.g., mouse pads) are typically used. Thus, a major limitation of such a device is that it requires a tracking surface with particular characteristics, such as adequate friction and cleanliness, which are not readily found on all surfaces that would otherwise be useful for tracking.

Building upon these primarily mechanical tracking devices, optical tracking devices have become available. Such devices optically track movement of a surface, rather than mechanically as with the devices described immediately above. These optical tracking devices may avoid some of the drawbacks associated with the mechanical devices described above. In particular, optical devices typically do not require wheels in contact with a movable ball, which acts as a common collection point for dust and dirt. Instead, the movable ball may be covered with a distinct pattern. As the ball rotates over a surface due to movement of the input device, photodetectors facing another side of the ball collect information about the movement of the ball's distinct pattern as the ball rotates. A tracking engine then collects this information, determines which way the pattern is translating and translates a cursor on the screen similarly, as described above. Lift-off detection is performed as discussed above, when lifted the ball stops moving so the device stops tracking. These devices offer improvements over previous designs by eliminating moving parts (the wheels) and changing the ball detection interaction from mechanical to optical. However, such devices lack the ability to track on any surface, requiring a suitable frictional interface between the ball and the surface. Moreover, these devices still require one moving part, namely, the ball. In addition, aliasing artifacts may cause the cursor to skip, rather than move fluidly.

Still other optical devices place a pattern on the tracking surface (e.g., a mouse pad), rather than on the rotatable ball, thereby using the mouse pad to generate optical tracking information. Although such devices are able to eliminate the moving ball, they are less universal by requiring a specific tracking surface to operate.

Other more recent optical tracking devices eliminate the need for a patterned ball or mouse pad. One such device utilizes an LED to project light across the tracking surface at a grazing angle relative to the tracking surface. The mouse then collects tracking information by two methods: first, by tracking changes in color on the tracking surface by any pattern that may appear on the tracking surface; or second, by detecting dark shadows cast by high points in the surface texture, which appear as dark spots. Such an LED device eliminates the moving ball of previous devices, and is useful on a variety of surfaces. However, smooth surfaces with little color variation, such as surfaces with a fine microfinish similar to glass or clear plastic, may prove difficult to track upon. More importantly, these systems lack the ability to detect when the device has been removed from the tracking surface (lift-off) for freezing the cursor. Without freezing the cursor upon lift-off, the tracking device will continue to track when the user is attempting to reposition the device on the tracking surface while leaving the cursor in the same place.

SUMMARY OF THE INVENTION

Accordingly, a data input device capable of generating laser light beams altered by Doppler self-mixing effects, detecting altered characteristics of the projected light beams, determining the relative distance between the data input device and the tracking surface as a function of the altered characteristic of the projected light beam is desired to address one or more of these and other disadvantages.

In accordance with one aspect of the invention, a data input device for use with a tracking surface having light-scattering properties with respect to the device is disclosed. The device comprises a single laser having a cavity from which a light beam is projected. The laser is configured to project the light beam onto the tracking surface. At least a portion of the light beam striking the tracking surface reflects back into the cavity of the laser and thereby alters at least one characteristic of the projected light beam. A detector associated with the laser detects the altered characteristic of the light beam projected by the laser. A controller responsive to the detector determines the relative distance between the data input device and the tracking surface as a function of the altered characteristic of the projected light beam detected by the detector.

In another aspect of the invention, a data input device for use with a tracking surface having light-scattering properties with respect to the device is disclosed. The device comprises a laser having a cavity from which a light beam is projected onto the tracking surface. The light beam is oriented substantially perpendicular to the tracking surface when the device is operating in a tracking mode. At least a portion of the light beam striking the tracking surface reflects back into the cavity of the laser substantially as set forth above. The device further comprises a detector and a controller substantially as set forth above.

In yet another aspect of the invention, a method comprises projecting a light beam from a laser having a laser cavity onto a tracking surface and receiving at least a portion of the light reflected by the tracking surface within the laser cavity. The method further comprises mixing the received reflected light with light generated within the laser cavity. The mixing thereby alters at least one characteristic of the projected light beam. A light beam with the at least one altered characteristic is projected from the laser cavity. The method further comprises detecting the at least one altered characteristic of the light beam and determining the relative distance between the laser cavity and the tracking surface as a function of the at least one altered characteristic of the projected light beam.

In still another aspect of the invention, a data input device for use with a tracking surface comprises a single laser and a detector generally as set forth above. The device further comprises a controller responsive to the detector for operating the device in a tracking mode or a non-tracking mode depending upon the at least one altered characteristic of the projected light beam.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
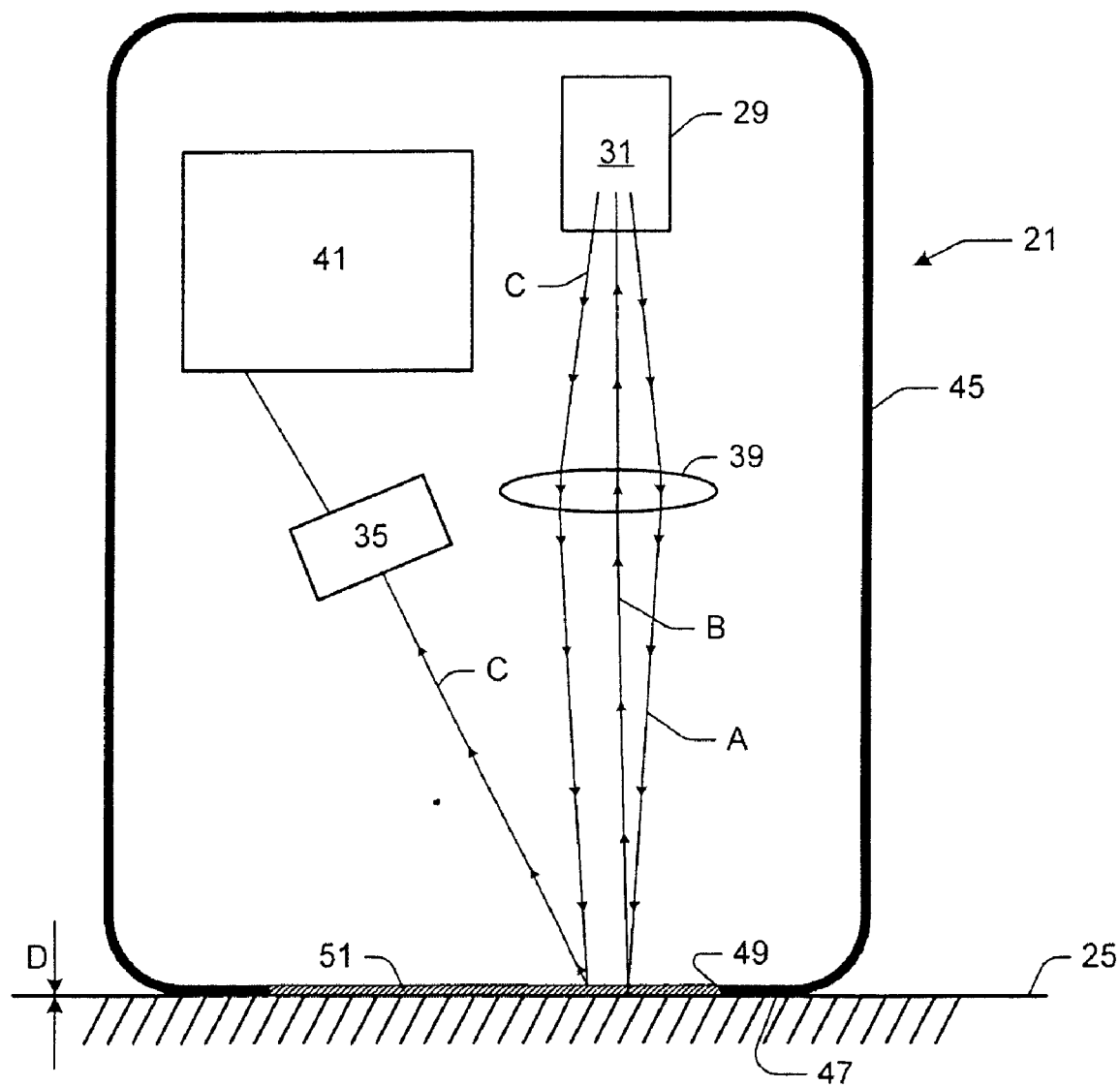
FIG. 1 is a schematic of a device of the present invention engaging a tracking surface.
Figure 2:
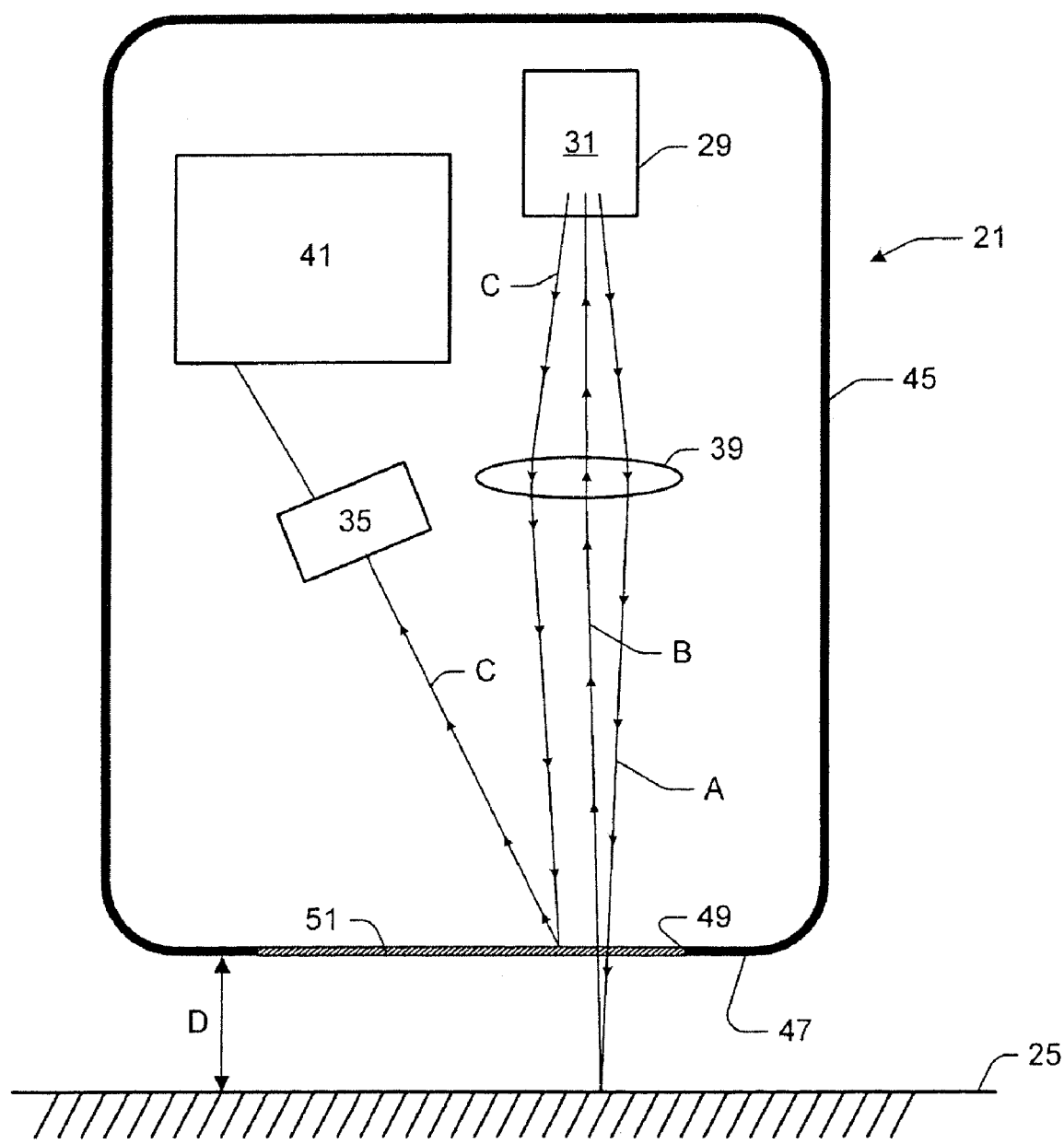
FIG. 2 is a schematic of the device of FIG. 1 lifted from the tracking surface.

Referring first to FIGS. 1 and 2, a data input device, generally indicated 21, for use with a tracking surface 25 is depicted. Although such a device 21 is typically capable of tracking relative movement between the device and the tracking surface 25 (described above as horizontal-vertical movement or x-y movement), it should be noted here that a focus of the present disclosure specifically involves lift-off detection. Any of the various tracking schemes known in the relevant art may be coupled with the teaching of the present invention for lift-off detection. It should be noted here that the terms "lift-off" or "lifting" the device 21 additionally comprise either lifting, or moving, the tracking surface 25 away from the stationary device (e.g., FIG. 6), or lifting the device away from the tracking surface (e.g., FIGS. 2, 3 and 5). In addition, referring to relative movement between the device 21 and the tracking surface 25 in a z-direction may comprise movement of the device (e.g., a mouse moving over a mouse pad), movement of the tracking surface (e.g., a moving trackball or human skin moving in the path of a laser light beam), or movement of both the tracking surface and the device.

The device 21 generally comprises a single laser 29 for projecting a laser light beam A onto the tracking surface 25. A portion of the light beam A striking the tracking surface 25 reflects back as light beam B into a cavity 31 of the laser and thereby alters at least one characteristic of the subsequently projected light beam C (see FIGS. 1 and 2). Mixing of the reflected light beam B with the light generated within the cavity 31 of the laser 29 is known in the art as self-mixing. Self-mixing is well documented in scientific literature (e.g., Wang et al., *Self-Mixing Interference Inside a Single-Mode Diode Laser for Optical Sensing Applications*, JOURNAL OF LIGHTWAVE TECHNOLOGY 1577-1587, Vol. 12, No. 9, 1994.) and will not be discussed in great detail here. Suffice it to say that mixing of laser light B backscattered (i.e., reflected back) from the tracking surface 25 and into the cavity 31 of the laser 29 will alter the output of light beam C of the laser. By detecting even small alterations in the output C of the laser 29, the movement of the tracking surface 25 relative to the laser cavity 31, and in turn the device 21 itself, may be understood. Once this relative movement is understood in real time, both the speed and the position of the laser 29 and thus the device 21, relative to the tracking surface 25 may be readily ascertained, as will be discussed below in greater detail.

Figure 3:
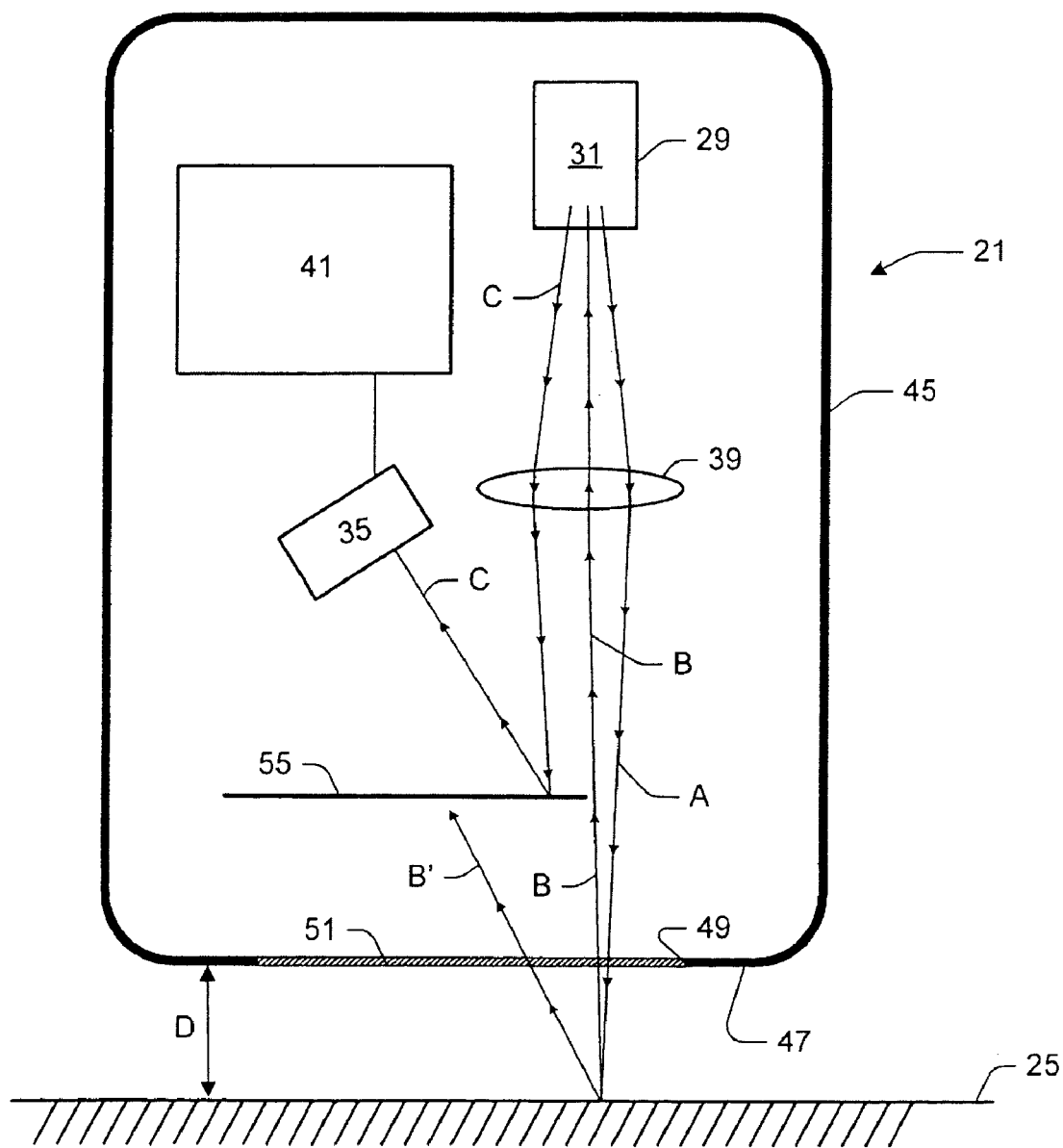
FIG. 3 is a schematic of another device of the present invention lifted from the tracking surface.
Figure 4:
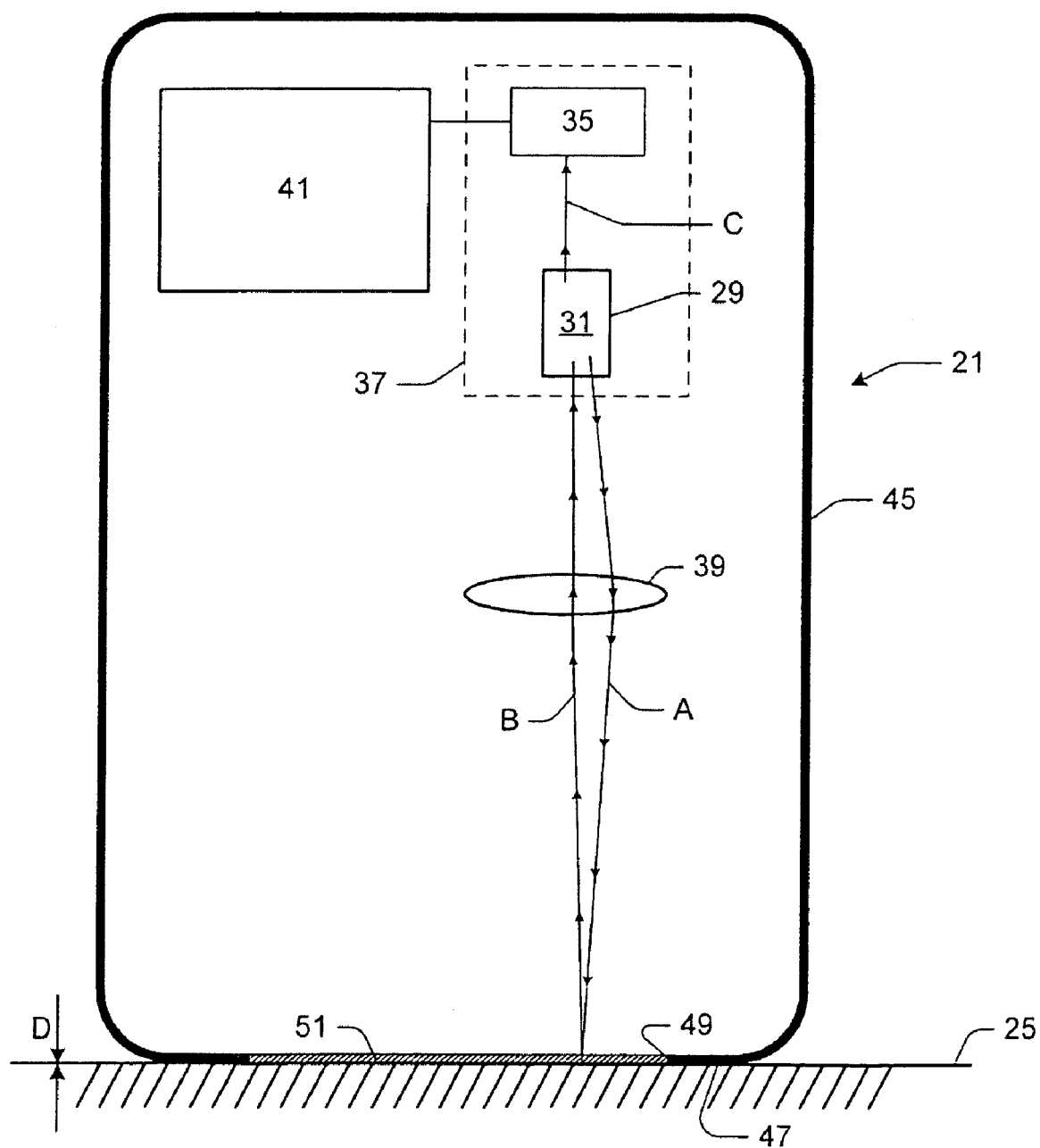
FIG. 4 is a schematic of yet another device of the present invention engaging the tracking surface.
Figure 5:
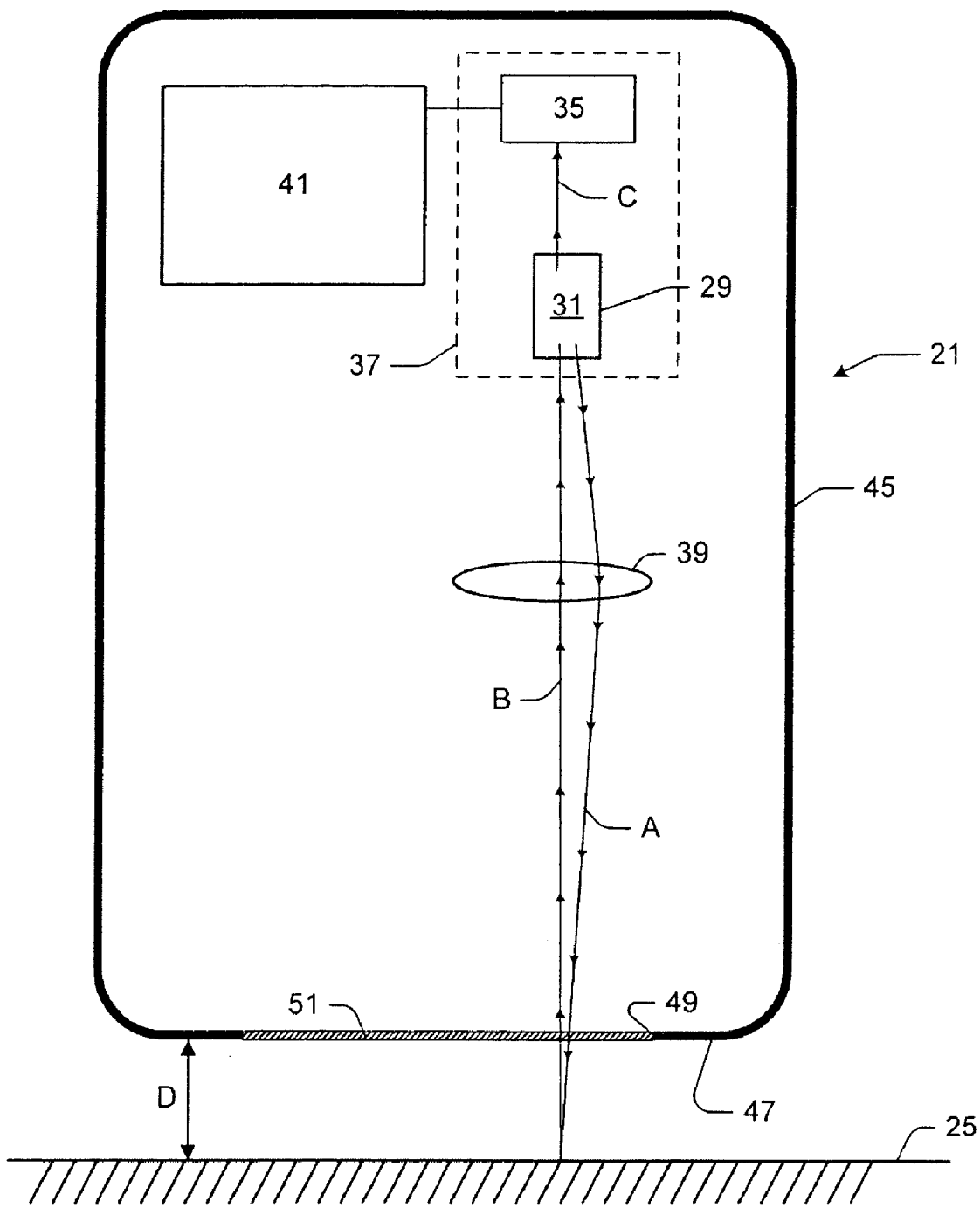
FIG. 5 is a schematic of the device of FIG. 4 lifted from the tracking surface.

The device 21 further comprises a detector 35 associated with the laser 29 for detecting light beam C projected by the laser and having at least one altered characteristic. The detector 35 and laser 29 may be mounted separately in the device 21 as depicted in FIGS. 1-3, or the laser and the detector may be mounted adjacent each other on a substrate 37, such as a micro-chip, a printed circuit board (PCB) or a leadframe, as depicted in FIGS. 4 and 5. Many lasers 29 include a detector 35 within the laser itself for use in monitoring the intensity of the laser light. When available, such detectors 35 may be utilized rather than adding an entirely new detector for use with the laser 29. Detectors 35 may include photodetectors, CCDs (charge-coupled devices), CMOS (complementary metal-oxide semiconductor) technology or other detector arrays that are capable of both the bandwidth and spectral requirements mandated by the laser 29.

The device 21 further comprises an optic 39 positioned between the laser 29 and the tracking surface 25 for refracting the light beams (A, B, and in some embodiments C) between the tracking surface and the laser. Although the device 21 will function properly without an optic 39, the optic in this embodiment provides additional focusing and guidance of the light beams, ensuring that the signal reaching the detector 35 is strong.

In addition, the device 21 comprises a controller 41 responsive to the detector 35 for determining the relative distance D between the device and the tracking surface 25 as a function of the at least one altered characteristic of the projected light beam C. The at least one altered characteristic of the light beam C may include a Doppler waveform frequency shift, Doppler waveform asymmetry, or changes in amplitude of the Doppler waveform, as discussed in detail below. In addition, the controller 41 is responsive to the detector 35 for operating the device 21 in a tracking mode or a non-tracking mode, depending upon the at least one altered characteristic of the light beam C.

The device 21 further comprises a housing 45 for containing and protecting the components of the device. The housing 45 includes a support surface 47 adapted to engage the tracking surface 25 during a tracking mode of the device 21. The housing 45 may take any form, without departing from the scope of the claimed invention. For example, the housing 45 may be in the shape of a mouse, a trackball, an optical pen or any other data input device 21. The housing 45 further comprises an aperture 49 covered by a transparent window 51 that allows the light beam A to pass through the housing and fall upon the tracking surface 25, while limiting the ability of dust and dirt to enter the housing.

Referring now to FIG. 3, the housing 45 may further comprise a field stop 55, or reference surface, limiting the direction in which the light beam B reflected from the tracking surface 25 can strike the detector 35. In this example, the light beam B reflected by the tracking surface 25 does not fall directly upon the detector 35. As depicted in FIG. 3, a reference surface 55 acts as a field stop, limiting light beam B' from directly reflecting from the tracking surface 25 to the detector 35. The reference surface 55 may also be incorporated into the housing 45 itself, as a part of the transparent window 51, which partially transmits light and partially reflects light (see FIGS. 1 and 2), thereby eliminating the need for an additional reference surface. Detecting only light reflected by the reference surface helps minimize any noise or signal aberrations introduced by features of the tracking surface 25. Without such a separate reference surface, such as the device 21 of FIGS. 1 and 2, however, reflected light beam B, or ambient light reflected between the device 21 and the tracking surface 25, may reach the detector 35, increasing the noise in detected signals. Repositioning or resizing the reference surface 55 depending upon the dimensions of the device 21 or arrangement of the device components is within the skill of one skilled in the art and will not be discussed in great detail here.

The device 21 may incorporate a variety of different lasers 29, as long as the lasers are capable of exhibiting the self-mixing phenomenon. Exemplary lasers 29 will draw as little power as possible. For instance, a suitable laser 29 draws less than about 1.0 mW (1.3 μhorsepower) of power. This ensures that the laser 29 may be used in a cordless device application without unduly limiting the battery life of the device. The eye-safety regulation is another consideration factor in limiting the output power from the laser. In particular, the laser 29 may also be a solid-state device, such as a vertical cavity surface emitting laser (VCSEL) or an edge-emitting laser (EEL). A gas-based laser, such as a Helium-Neon (He—Ne) laser, may also be used. Other lasers and sources of laser, or coherent, light capable of exhibiting self-mixing phenomena may also be utilized without departing from the scope of the claimed invention.

Most tracking surfaces 25 will reflect a sufficient amount of light beam B back to the laser cavity 31 because they are optically rough, having adequate light-scattering properties with respect to the device 21. An optically rough surface scatters laser light in many directions, making the orientation of the laser 29 with respect to the tracking surface 25 relatively unimportant. For example, for most tracking surfaces 25, the light beam A may be oriented at any angle relative to the tracking surface because the optically rough tracking surface backscatters laser light in many directions, including back toward the laser 29. The location of the laser cavity 31 relative to this angle, therefore, is relatively unimportant, as long as the laser cavity receives a small portion of the laser light beam reflected from the tracking surface 25. For example, optically rough surfaces include many common tracking surfaces 25, including paper, wood, metal, fabric, certain plastics and human skin.

Only surfaces that are perfectly reflective, i.e., mirror-like, such as a ground and polished, optic-quality, flat, transparent glass, are insufficiently rough to backscatter laser light in many directions. Such surfaces that are not optically rough will act as a mirror and only reflect laser light exactly opposite the angle of incidence of the laser 29. For the present device 21 to detect lift-off from such a tracking surface 25, the laser 29 and detector 35 may be oriented such that the reflected laser light beam B reenters the laser cavity 31 for self-mixing and the altered laser light beam C strikes the detector. One such configuration allows for self-mixing with a perfectly reflective tracking surface 25, even without backscattering in many directions, wherein the laser 29 is oriented substantially perpendicular to the tracking surface 25 when the device 21 is operating in a tracking mode (see FIGS. 4 and 5). Moreover, the detector 35 is oriented perpendicular to the tracking surface 25 and located behind the laser 29, such that it can detect the at least one altered characteristic of light beam C projected from the rear of the laser. In one example, an edge-emitting laser (EEL) 29 may have its detector 35 located behind the laser. By orienting the light beam A and detector 35 in alignment substantially perpendicular to the tracking surface 25, a portion of the light beam B striking the tracking surface reflects back into the cavity 31 of the laser 29 and thereby alters at least one characteristic of the projected light beam C.

Figure 6:
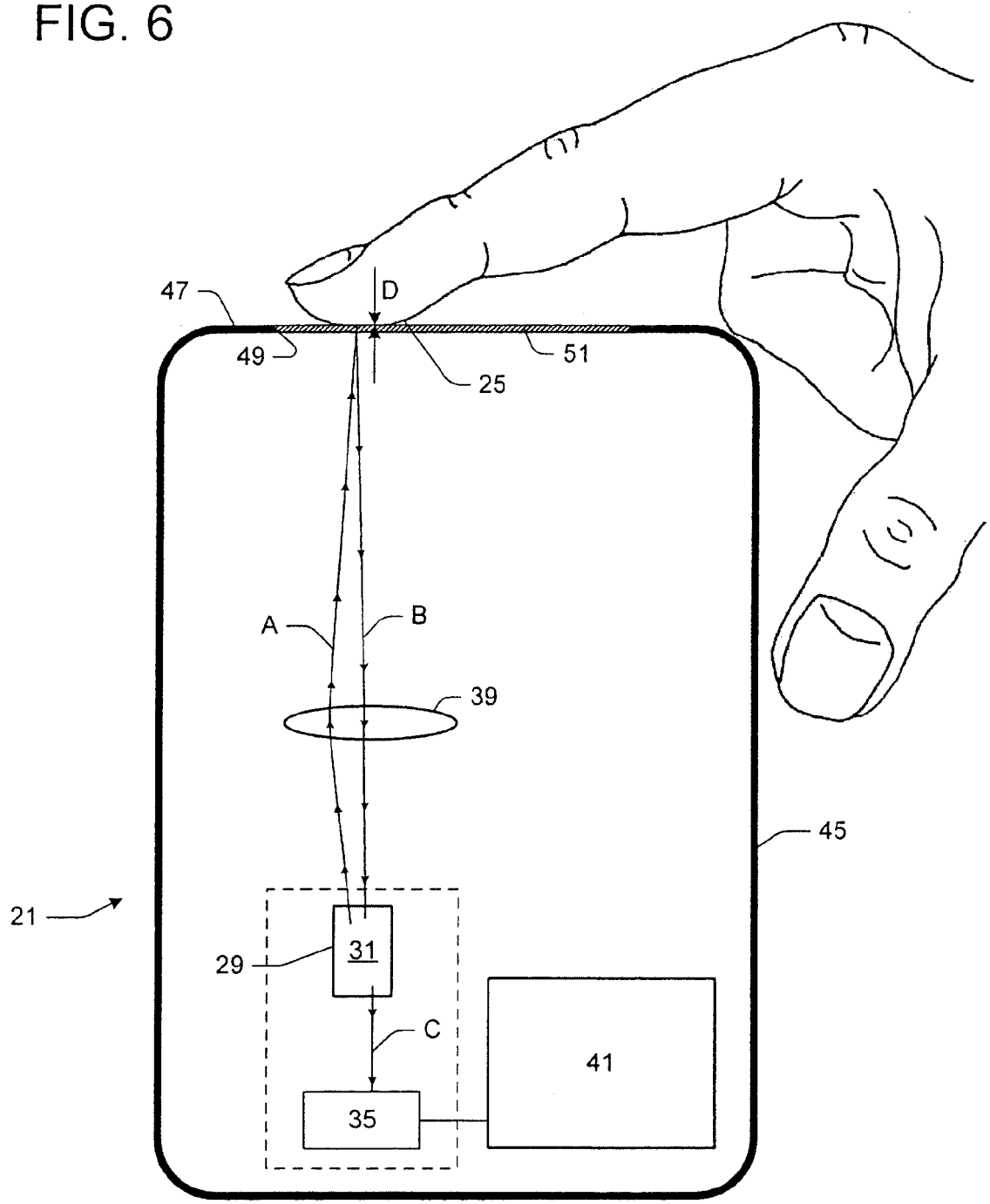
FIG. 6 is a schematic of the device of FIG. 1 engaging a tracking surface of human skin.

Referring now to FIG. 6, a device 21 is depicted wherein the tracking surface 25 is human skin. In particular, the tracking surface 25 shown is a human finger. This device 21 demonstrates that the device itself may be stationary while the tracking surface 25 moves relative to the device. The functioning of the device components, such as the laser 29, the detector 35 and the controller 41 are identical. A device 21 as depicted in FIG. 6 allows the user to move his hand, the tracking surface 25, over the device such that when the finger moves away from the device, the detector 35 and controller 41 are able to detect lift-off and stop tracking, respectively.

Figure 7:
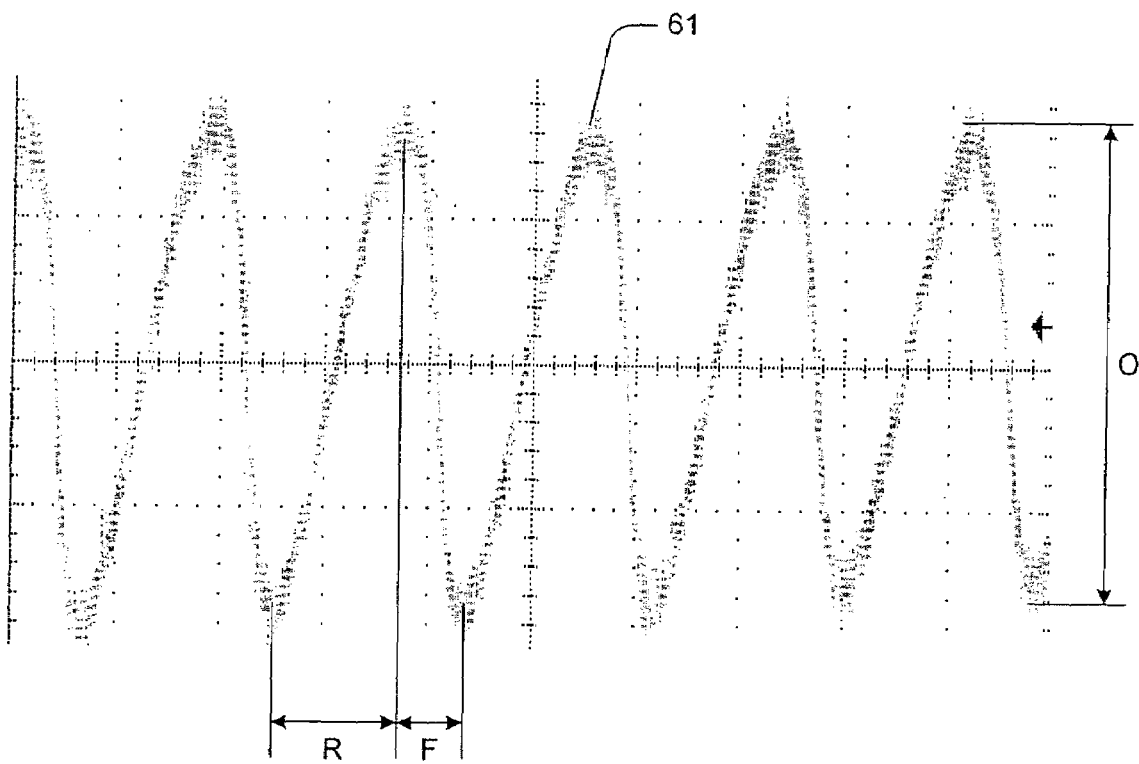
FIG. 7 is an example of a frequency wave of a projected laser light beam having at least one altered characteristic.

Turning now to specifics of the detected at least one altered characteristic of light beam C, a frequency shift is one of the altered characteristics of the light beam that may allow for determining the distance D between the device 21 and the tracking surface 25. The Doppler waveform 61 depicted in FIG. 7 is such a waveform, wherein the x-axis indicates time in micro-seconds (ms) and the y-axis indicates laser intensity in milli-volts (mV). The projected light beam C created by self-mixing within the laser cavity 31 has a component with frequency proportional to the magnitude of the velocity, or speed, of any relative displacement between the tracking surface 25 and the device 21. For example, as the relative displacement between the device 21 and the tracking surface 25 increases, the Doppler waveform 61 indicates a corresponding increase in frequency, thereby bringing the peaks and troughs of the waveform closer to one another. In contrast, as the relative displacement between the device 21 and the tracking surface 25 decreases, the frequency of the Doppler waveform 61 indicates a corresponding decrease in frequency, thereby pushing the peaks and troughs of the waveform further from one another. Therefore, by detecting and monitoring the frequency of the Doppler waveform 61, the relative speed between the device 21 and the tracking surface 25 is known. Once known, the speed (which is proportional to the Doppler waveform frequency) may be integrated over time to calculate the relative displacement between the device 21 and the tracking surface 25.

Another monitored characteristic of the Doppler waveform 61 of the projected light beam C is the direction of any asymmetry in the Doppler waveform 61, which indicates the direction of relative movement between the tracking surface 25 and the device 21. For example, for the waveform 61 depicted in FIG. 7, the rise time R of each cycle of the waveform is longer than the fall time F of each cycle of the waveform. Such a waveform indicates that the tracking surface 25 and device 21 are moving relatively toward one another. Conversely, a device 21 exhibiting a Doppler waveform having an altered characteristic of light beam C having a rise time R shorter than its fall time F (not shown) indicates that the tracking surface 25 and device 21 are moving relatively away from one another. Therefore, by detecting and monitoring the shape of the Doppler waveform 61, namely the length of its rise and fall times, the direction of relative displacement between the device 21 and the tracking surface 25 is known. Moreover, one skilled in the art would readily understand how to switch the waveform asymmetry to indicate a particular relative direction.

An additional monitored characteristic of the projected light beam C is the modulation of power output of the laser 29. Self-mixing in the laser cavity 31 will induce changes in the power output of the laser 29, which will in turn induce changes in the amount of laser light projected by the laser. To detect and measure these changes in output, the present invention turns again to the Doppler waveform 61 of the projected light beam C having at least one altered characteristic. Specifically, the power of the Doppler component of the laser 29 is proportional to the amount of light reflected off the surface and received by the detector 35, which is represented by the amplitude O of the Doppler waveform 61. As this amplitude O increases, more reflected laser light is reaching the detector 35, resulting in stronger self-mixing within the laser cavity 31, which further indicates that the device 21 and tracking surface 25 are moving relatively closer to one another. Conversely, as amplitude O decreases, less laser light is reaching the detector 35, indicating less self-mixing within the laser cavity 31, which further indicates that the device 21 and tracking surface 25 are moving relatively apart from one another. Therefore, by detecting and monitoring the amplitude O of the Doppler waveform 61, which indicates movement of the device 21 and tracking surface 25 relative one another. Should the amplitude O fall below a threshold level, the device 21 may be deemed in lift-off mode and tracking suspended.

The present invention further comprises a method comprising projecting a light beam A from a laser 29 of a data input device 21 onto a tracking surface 25 substantially as set forth above. A cavity 31 of the laser 29 receives light beam B reflected by the tracking surface 25 for mixing with the laser light generated within the laser cavity. The mixing thereby alters at least one characteristic of the projected light beam. The laser 29 then projects a light beam C having at least one altered characteristic, and a detector 35 detects the at least one altered characteristic of the light beam. The altered characteristic of the detected light beam C may be frequency or light intensity. The relative distance D between the device 21 and the tracking surface 25 may then be determined as a function of the detected at least one altered characteristic of the light beam C.

Furthermore, the data output of the data input device 21 is altered as a function of the determined relative distance D between the device 21 and the tracking surface 25. For example, the method further comprises comparing the relative distance D between the device 21 and the tracking surface 25 to a lift-off detection distance and altering the data output of the data input device as a function of the comparison. The method further suspends tracking of relative movement between the device 21 and the tracking surface 25 when the device is spatially separated from the tracking surface by at least the lift-off detection distance. Conversely, the device 21 maintains tracking of relative movement between the device and the tracking surface 25 when the device is spatially separated from the tracking surface by less than the lift-off detection distance. In this manner, the device 21 only tracks relative movements of the tracking surface 25 when the tracking surface is in contact or close proximity to the device, as with traditional data input devices. Many different devices 21 may be constructed according to the above methods. For example, one device comprises a lift-off detection distance of no more than about 4 millimeters (0.16 inch). Another device comprises a lift-off detection distance of no more than about 4 millimeters (0.16 inch) and at least about 0.5 millimeter (0.02 inch). Yet another device comprises a lift-off detection distance of no more than about 3 millimeters (0.12 inch) and at least about 0.5 millimeter (0.02 inch).

The method may additionally require that the light beam C projected from the laser 29 be reflected from a reference surface 55 prior to detecting. As discussed above, reflecting the light beam C having at least one altered characteristic from the reference surface 55 improves consistency because surface properties of the reference surface are known and constant, making them identical throughout use of the device 21, irrespective of the surface properties of the tracking surface 25. The reference surface 55 can be mounted on the data input device 21 or can be part of the housing 45 of the data input device.

The method may also determine the speed of any relative displacement between the tracking surface 25 and the device 21 and may alter the data output of the data input device as a function of the speed. For example, moving the device 21 and the tracking surface 25 relative one another at different speeds may place the tracking device into different modes of use, as directed by the user.

Figure 8:
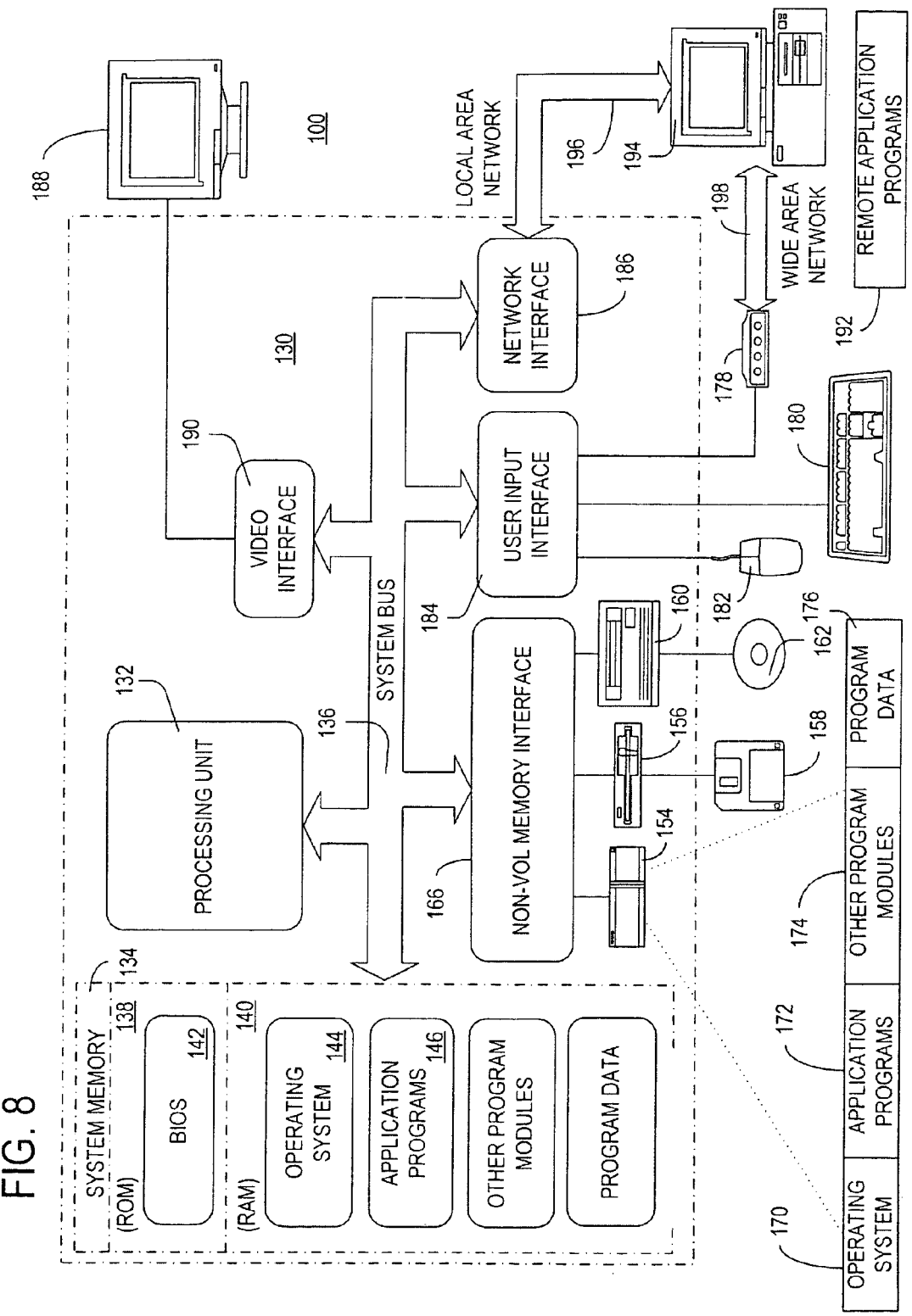
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory. 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid-state RAM, solid-state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or substantially all of the elements described above relative to computer 130. The logical connections depicted in FIG. 8 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A data input device for use with a tracking surface, said tracking surface having light-scattering properties with respect to said device, said device comprising:
   a single laser having a cavity from which a light beam is projected, said laser being configured to project the light beam onto said tracking surface, at least a portion of the light beam striking said tracking surface reflecting back into the cavity of said laser, said light beam being subsequently projected and thereby altering at least one characteristic of the light beam projected by the laser, wherein said subsequently projected light beam is reflected from a reference surface acting as a field stop for limiting direct detection of light reflected from the tracking surface prior to said detecting;
   a detector associated with the laser for detecting said altered characteristic of the light beam projected by the laser; and
   a controller responsive to the detector for determining the relative distance between said device and said tracking surface as a function of the altered characteristic of the subsequently projected light beam detected by the detector.

2. A device as set forth in claim 1 wherein said at least one altered characteristic is a frequency shift in the projected light beam of the laser.

3. A device as set forth in claim 2 wherein a Doppler waveform of said projected light beam having at least one altered characteristic has a frequency proportional to the speed of any relative displacement between the tracking surface and the device.

4. A device as set forth in claim 2 wherein a Doppler waveform of said projected light beam having at least one altered characteristic has an asymmetrical waveform indicating the direction of movement of the tracking surface and the device relative one another.

5. A device as set forth in claim 4 wherein a Doppler waveform of said projected light beam having at least one altered characteristic has a rise time longer than its fall time, indicating that the tracking surface and device are moving relatively toward one another.

6. A device as set forth in claim 4 wherein a Doppler waveform of said projected light beam having at least one altered characteristic has a rise time shorter than its fall time, indicating that the tracking surface and device are moving relatively away from one another.

7. A device as set forth in claim 1 wherein said at least one altered characteristic is a modulation of power output of the projected light beam of the laser.

8. A device as set forth in claim 7 wherein a Doppler waveform of said projected light beam having at least one altered characteristic has an amplitude proportional to the amount of light received by the detector.

9. A device as set forth in claim 1 further comprising a housing, said single laser and detector mounted on said housing.

10. A device as set forth in claim 9 wherein said housing is adapted to contact said tracking surface.

11. A device as set forth in claim 9 wherein said laser and said detector are mounted adjacent each other on at least one of a micro-chip, a printed circuit board (PCB) and a lead-frame.

12. A device as set forth in claim 1 wherein the laser draws less than about 1.0 mW (1.3 μhorsepower).

13. A device as set forth in claim 1 wherein said laser is a solid-state device.

14. A device as set forth in claim 1 wherein said laser is at least one of a vertical cavity surface emitting laser (VCSEL) and an edge-emitting laser (EEL).

15. A device as set forth in claim 1 wherein said tracking surface is human skin.

16. A device as set forth in claim 1 wherein the detector associated with the laser monitors the intensity of the laser.

17. A device as set forth in claim 1 further comprising an optic positioned between the laser and the tracking surface for refracting the light beam between the tracking surface and the laser.

18. A data input device for use with a tracking surface, said tracking surface having light-scattering properties with respect to said device, said device comprising:
   a laser having a cavity from which a light beam is projected, said laser being configured to project the light beam onto said tracking surface, said light beam oriented substantially perpendicular to said tracking surface when said device is operating in a tracking mode, at least a portion of the light beam striking said tracking surface reflecting back into the cavity of said laser, said light beam being subsequently projected and thereby altering at least one characteristic of the light beam projected by the laser, wherein said subsequently projected light beam is reflected from a reference surface acting as a field stop for limiting direct detection of light reflected from the tracking surface prior to said detecting;

a detector associated with the laser for detecting said altered characteristic of the light beam projected by the laser; and a controller responsive to the detector for determining the relative distance between said device and said tracking surface as a function of the altered characteristic of the subsequently projected light beam detected by the detector.

19. A device as set forth in claim 18 wherein said at least one altered characteristic is a frequency shift in the light beam projected by the laser.

20. A device as set forth in claim 18 wherein said at least one altered characteristic is a modulation of power output of the light beam projected by the laser.

21. A device as set forth in claim 18 further comprising a housing, said laser and detector mounted on said housing.

22. A device as set forth in claim 21 wherein said housing is adapted to contact said tracking surface and orient said laser with respect to said tracking surface.

23. A device as set forth in claim 18 wherein said tracking surface is human skin.

24. A method comprising:
projecting a light beam onto a tracking surface from a laser having a laser cavity, wherein a data input device includes said laser and laser cavity, said light beam being subsequently projected, said subsequently projected light beam is reflected from a reference surface acting as a field stop for limiting direct detection of light reflected from the tracking surface prior to said detecting;

receiving at least a portion of the light reflected by the tracking surface within the laser cavity;

mixing said received reflected light with light generated within said laser cavity, said mixing thereby altering at least one characteristic of said light beam projected by the laser;

subsequently projecting a light beam with said at least one altered characteristic from said laser cavity;

detecting said at least one altered characteristic of the subsequently projected light beam; and determining the relative distance between said device and said tracking surface as a function of the at least one altered characteristic of the subsequently projected light beam.

25. The method as set forth in claim 24 further comprising altering data output of the data input device as a function of the determined relative distance.

26. The method as set forth in claim 24 wherein said reference surface is mounted on said data input device.

27. The method as set forth in claim 26 wherein said reference surface is a housing of said data input device.

28. The method as set forth in claim 24 further comprising determining the speed of any relative displacement between the tracking surface and the device.

29. The method as set forth in claim 28 further comprising altering the data output of the data input device as a function of the speed.

30. The method as set forth in claim 24 wherein said detected at least one altered characteristic of the light beam is frequency.

31. The method as set forth in claim 24 wherein said detected at least one altered characteristic of the light beam is light intensity.

32. The method as set forth in claim 24 further comprising comparing said relative distance between said device and said tracking surface to a lift-off detection distance and altering the data output of the data input device as a function of the comparison.

33. The method as set forth in claim 32 further comprising (i) suspending tracking of relative movement between said device and said tracking surface when said device is spatially separated from said tracking surface by at least the lift-off detection distance and (ii) maintaining tracking of relative movement between said device and said tracking surface when said device is spatially separated from said tracking surface by less than said lift-off detection distance.

34. The method as set forth in claim 32 wherein said lift-off detection distance is no more than about 4 millimeters (0.16 inch).

35. The method as set forth in claim 34 wherein said lift-off detection distance is no more than about 4 millimeters (0.16 inch) and at least about 0.5 millimeter (0.02 inch).

36. The method as set forth in claim 35 wherein said lift-off detection distance is no more than about 3 millimeters (0.12 inch) and at least about 0.5 millimeter (0.02 inch).

37. A data input device for use with a tracking surface, said device comprising:
a single laser having a cavity from which a light beam is projected, said laser being configured to project the light beam onto said tracking surface, at least a portion of the light beam striking said tracking surface reflecting back into the cavity of said laser, said light beam being subsequently projected and thereby altering at least one characteristic of the light beam projected by the laser, wherein said subsequently projected light beam is reflected from a reference surface acting as a field stop for limiting direct detection of light reflected from the tracking surface prior to said detecting;

a detector associated with the laser for detecting said at least one altered characteristic of the light beam projected by the laser; and a controller responsive to the detector for operating the device in a tracking mode or a non-tracking mode depending upon said at least one altered characteristic of the subsequently projected light beam.

38. A device as set forth in claim 37 wherein said at least one altered characteristic is a frequency shift in the projected light beam of the laser.

39. A device as set forth in claim 37 wherein said at least one altered characteristic is a modulation of power output of the projected light beam of the laser.

* * * * *